United States Patent [19]

Ruberg

[11] 4,278,114

[45] Jul. 14, 1981

[54] KITCHEN APPLIANCE FOR STORING PERISHABLE GOODS

[75] Inventor: Richardt E. Ruberg, St. Gallen, Switzerland

[73] Assignee: Zyliss Zysset AG, Lyss, Switzerland

[21] Appl. No.: 38,806

[22] Filed: May 14, 1979

[30] Foreign Application Priority Data

May 19, 1978 [DE] Fed. Rep. of Germany ....... 2821852

[51] Int. Cl.³ .............................................. B65B 31/04
[52] U.S. Cl. ...................................... 141/65; 53/103; 137/565; 417/566
[58] Field of Search ...................................... 141/1–11, 141/20, 37–66, 250, 258–261; 417/566; 137/565; 222/207, 213, 307; 53/88, 103

[56] References Cited

U.S. PATENT DOCUMENTS 2,436,849 3/1948 Billeter .................................. 141/65

*Primary Examiner*—Houston S. Bell, Jr.
*Attorney, Agent, or Firm*—H. Dale Palmatier

[57] ABSTRACT

A container with an air tight lip incorporating a check valve for only evacuating air from the container by a piston suction pump sealed against the lip and around the check valve; the pump being arranged to receive manual pressure to produce the suction stroke and to simultaneously enhance the seal between the lip and the pump.

10 Claims, 2 Drawing Figures

KITCHEN APPLIANCE FOR STORING PERISHABLE GOODS

The invention relates to a kitchen appliance for storing goods which, when subjected to ambient air, are perishable. Such goods will, in most cases, be food stuff but may comprise chemical compounds in general. For example, the invention may be used for storing dyes.

BACKGROUND OF THE INVENTION

It is known to use for such purposes a container having a hermetically sealing lid which is provided with a check valve. By means of a suction pump, a partial vacuum may be created within the container, the air being withdrawn via the check valve which will open during the pumping action. Due to the reduced air pressure, waste of the goods will at least be delayed.

In one such device, the check valve is made of sealing material and simultaneously serves the purpose to sealingly engage the suction inlet of a pump.

It is also known to provide in the container lid a valve to be actuated manually. A piston pump may be thread-connected with a threaded flange which forms the valve body. The user is expected to open the valve by a rotational movement, to pull the piston so to evacuate the container and then to close the valve by making a return rotary movement while the piston is still pulled.

The designs mentioned above are advantageous over designs where the container lid and the pump form an assembly because only one pump is necessary for any number of containers plus lids. However, the handling during the evacuation does not satisfy. In fact, in order to evacuate by means of a piston pump the suction inlet of the pump must be sealingly engaged at or on the lid. Simple urging of the pump inlet onto the lid would be counteracted by the pulling force acting upon the pump piston so that the lid could be lifted, perhaps without the user's even taking notice of.

It is the object of the present invention to provide a kitchen appliance comprising a container, a container lid having a check valve, and a pump by which the container may be partially evacuated via said check valve, the appliance being easy to handle and reliable. Specifically, the appliance in accordance with the invention is designed such that the pump may be simply set onto the lid and will remain hermetically sealed without additional means during the evacuation process, and the sealing action will be the more efficient the greater the force will be with continuous pumping.

SUMMARY OF THE INVENTION

As defined in patent claim 1, the inventive concept contrasts with the usual disposition of a piston pump and a container to be evacuated by means of the pump in that the suction stroke of the pump pistion urges the pump cylinder onto the container lid because the suction inlet of the pump is on the side of the pump piston opposite the suction chamber of the pump cylinder. Upon pressing down of the piston, the pump cylinder is frictionally carried away with. Usually, the container to be evacuated stands on a table or the like, and the pressure exerted upon the lid by the pump will simultaneously hold the entire container firmly on the table. A quite stable and rigid system will result permitting to achieve substantial evacuation by repeated push-down actuation of the piston because correspondingly high forces may be transmitted. In particular, the piston pump may be designed with a piston of relatively great diameter and correspondly reduced piston stroke for a given volume per stroke so that the pump will become short and thickset but not cumbersome. Consequently, the area within the sealing line between pump and lid will be relatively large so that there is little risk for the pump to slide away when actuated. Further advantages and features of the invention may be derived from the following detailed description of preferred embodiments.

DETAILED DESCRIPTION OF THE DRAWINGS

Figure 1:
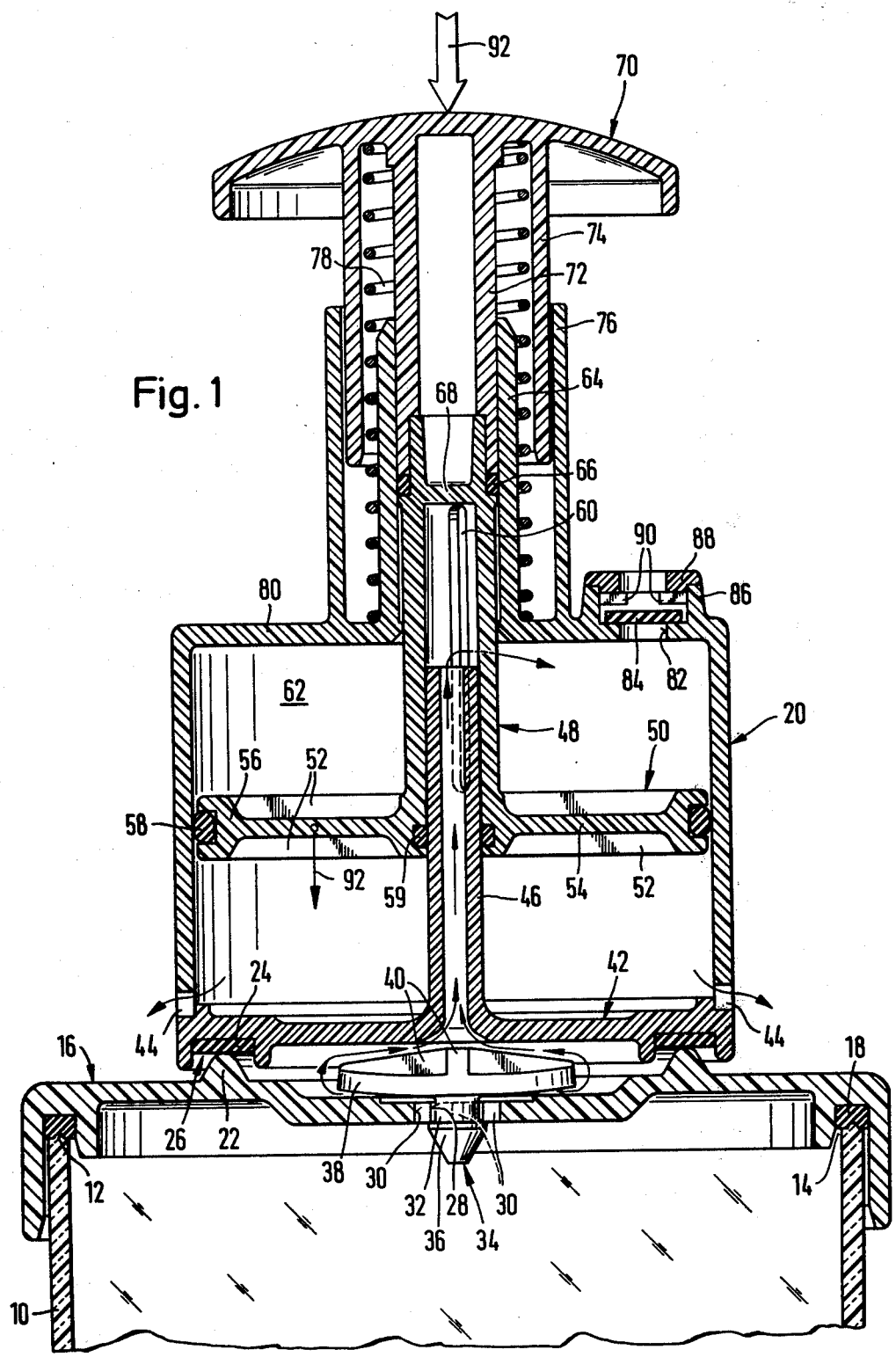
FIG. 1 shows in axial section view the kitchen appliance in accordance with the invention, the appliance comprising the container, its lid and the pump disposed to evacuate the container.

Referring first to FIG. 1, a container 10 is illustrated; its wall thickness is substantially thicker than that of ordinary containers of the same material, namely transparent plastics. The wall thickness is dimensioned such that it will withstand the subatmospheric pressure to be generated by the pump, say, 500 Millibar. Further, the container walls must resist the reactive forces created when the suction stroke of the pump acts vertically downwards. Although transparent plastics is the preferred material, it will be understood that other, non-transparent plastics or metal or cermaics may be used as well. The contour of the container preferably is such that it faces whereever possible are bulged outwards in order to increase its pressure resistance; otherwise, the shape of the container is up to the designer's choice.

The free upper edge of the container walls is provided with a protruding rib 12, and a lid 16 has a groove 14 with an embedded rubber or plastic seal 18 congruent with said rib.

A similar sealing system is provided between lid 16 and cylinder 20 of the pump. From the upper face of the lid, a rib 22 protrudes upwards, the rib having an annular configuration. Opposite to the annular rib 22 there is a sealing ring 24 embedded into a respective groove 26 of the pump cylinder. The height of rib 22 and the depth of groove 26 are dimensioned such that even if the pump when loosely set upon the lid is subjected to substantial forces acting downwards, never the rigid edge of the pump will abut at the lid and always at least a slight distance will remain. Within the rib 22, lid 16 is slightly depressed and has a throughbore 28 from which several short radial slots 30 extend. Over a short axial length, bore 28 is counterbored to about three times its diameter at the end opposite the container. Within bore 28 a flap valve 34 is mounted; the valve has a rod 32 extending through the bore, and an enlarged head 34 prevents removal of the valve which consists of rubber or soft plastics. Disc 38 forms the very valve body or flap and is stabilized by external webs 40.

Pump cylinder 20 is closed at its end adjacent the container lid by means of a cap 42 which in turn has groove 26. The cap face adjacent valve 34 is somewhat depressed so that the flap 38 may be lifted during the suction stroke of the pump. There is no need to seal cap 42 and cylinder 20 hermetically; on the contrary, there are even vent apertures (at least one) adjacent the joint between cylinder and cap in the form of openings 44 in the cylinder wall.

A suction pipe 46 extends from the center of the cap 42 upwards into the interior of the pump cylinder. The pipe bore opens at its lowwer end into the space confined by lid rib 22 and at its upper end into a hollow piston rod 48. Cap 42 and suction pipe 46 may be integrally formed, and similarly, piston rod 48 and piston 50 may be integrally formed by, for example, injection molding. Piston 50 comprises a plate 54 reinforced by radial spokes 52, plate 54 having an axially enlarged circumferential portion or flange 56 provided with a circumferential groove with a sealing ring 58. Similarly, the lower end of the piston rod 48 is sealed against suction pipe 46 by means of a slide ring seal 59.

The interior of the hollow piston rod communicates via at least one axially extending slot 60 with the suction chamber 62 of the pump cylinder 20 and with an axial extension thereof opposite cap 42, this extension being defined by a tubular member 64 against which the upper end of the piston rod is sealed by means of a slide ring seal 66. The latter is disposed between the closed end wall 68 of the piston rod and an actuating knob 70 connected with the rod by means of a snap-in or thread connection. A shaft 72 of knob 70 is slidingly guided in tubular member 64. The knob assembly is completed by a tubular depending skirt 74 which, in turn, is slidingly guided in an axial tube 76 extending upwards from the pump cylinder 20. Within the annular space between shaft 72 and skirt 74, and within the annular space between tubular member 64 and axial tube 76 there is disposed a slightly biased compression helical spring 78 which upon removal of depressing forces acting on knob 70 will return the latter and the parts connected thereto into the upper end position.

The endwall 80 of cylinder 20 has an axial opening 82 disposed at a point excentrically offset with respect to the cylinder axis. Opening 82 is covered by a rubber or soft plastics disc 84 serving as a flap valve. An upstanding edge 86 and a plug 88 confine the disc 84. Plug 88 has a bore extending therethrough, and inwardly protruding stop extensions 90 limit the lifting motion of disc 84.

The appliance described so far is operated as follows:

FIG. 1 illustrates the status with the piston having made about half of its suction stroke; the direction of this stroke is indicated by arrow 92. Although the stroke is only about 40 mm, because of the piston diameter of about 70 mm a volume of about 150 cm$^3$ is drawn via the following air path: Container interior—slots 30 in lid 16—about valve flap 38 which lifts into the space beneath cap 42—via central bore of suction pipe 46 into the hollow space of piston rod 48—and via the axial slots 60 of the latter into the suction chamber 62. During the downward suction stroke of the piston 50, air cannot enter from the ambient atmosphere into the suction chamber because valve disc 84 closes opening 82.

During the suction stroke, spring 78 is compressed. The air beneath piston 50 may escape via apertures 44. Near the end of the suction stroke, i.e. when piston 50 abuts the cap 42, within the container 10 as well as within the suction chamber the same subatmospheric pressure will prevail. The magnitude of the pressure reduction will, of course, depend upon the ratio between the suction chamber volume and the gas volume of the container. With the return stroke of the piston 50 the pressure will increase again within the chamber 62 so that valve 34 will close. As soon as the pressure in chamber 62 exceeds the ambient atmospheric pressure, valve disc 84 will lift and so establish pressure balance with the atmosphere.

Upon the next downward stroke of the piston, valve 34 will open again as soon as the pressure in chamber 62 will fall below the pressure in the container so that the evacuation continues, and with the return stroke the valve disc will open correspondingly later. With an assumed container volume of 1000 cm$^3$ six or seven piston strokes will suffice to reach a pressure of, say, 600 Millibar therein. The force required to actuate the piston increases with decreasing pressure in the container so that the handling indicates to the user when a sufficient vacuum will be reached.

To open the container it is only necessary to lift somewhat the valve disc or flap 34 by hand. Air will then flow into the container and after pressure balance being reduced, the lid may be easily taken off.

It is not a must to place the lid immediately on a container. There are possible modus of use where the container may be, for example, a plastic bag serving as a sheath for food to be deep frozen. In particular with food in the form of a "bulky mass" it is somewhat complicated to remove residual air from such a bag. Air removal is, however, highly desirable for reasons of quality and space requirements.

Figure 2:
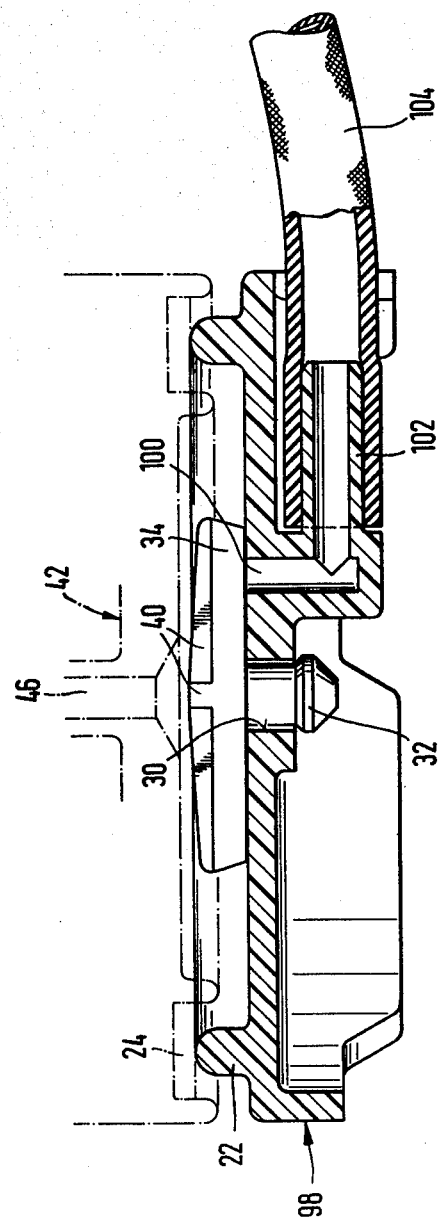
FIG. 2 is an axial section view through a lid for special purposes.

For such applications, it is advantageous to use the lid shown in FIG. 2. Lid 98 illustrated in this figure distinguishes over lid 16 of FIG. 1 in that the space within rib 22 communicates via a blind hole 100—which is normally by flap valve 34—and a nipple 102 with a hose 104 whose other end is put into such a bag or similar container, the bag neck being clamped about the hose. The pump will then be used as described above with reference to FIG. 1, and prior to complete removal of the hose from the bag, the neck of the latter will be tied.

If an evacuated container is refrigerated or simply cooled by placing it into a refrigerator, meat or vegetable or other food stuff contained therein will deliver humidity which will condensate at the coldest surfaces. These are the walls of the container. It is undesirable that such condensed water will get in contact with the food stuff, and it is therefore advantageous to provide the container either with a collecting pool adjacent its bottom and/or with an insert which houses the food but does not contact the walls. Appropriately spring 78 of the pump will be manufactured of metal. All other parts thereof preferably are injection molded plastic pieces, perhaps with the exception of sealing rings and valve flaps which may alternatively consist of natural rubber. Similar considerations are applicable for the container and its lid.

What I claim is:

1. A kitchen appliance comprising
at least one container for perishable goods,
a container lid sealingly connected with said container and provided with a check valve only permitting air flow out of the container, and
a manually operable suction piston pump sealingly engageable with said lid,
wherein the lid has an annular sealing rib embracing said check valve and adapted to engage an elastic sealing ring at the pump, and
wherein the pump is designed such that a suction stroke acting upon its piston enhances the engagement between said sealing ring and said lid rib, the pump having a suction chamber adjacent the piston and progressively increasing in size in response to the suction stroke to draw air from the container, and the pump having a check valve connected with the suction chamber and only permitting expulsion of air to the ambient from the suction chamber.

2. An appliance as set forth in claim 1 wherein the lid has an opening therethrough, the first mentioned check valve closing the opening and being made of flexible material to be manually deformed for releasing the vacuum in the container for removing the lid.

3. An appliance as set forth in claim 1 wherein the pump comprises a cylinder closed at its end adjacent said lid by a closure cap which is provided with said sealing ring, a suction pipe extending within said ring through said closure cap and through said piston, to provide communication between the container interior and said suction chamber at the side of the piston remote from said lid when the pump engages said lid rib with its sealing ring.

4. An appliance as set forth in claim 3 wherein said suction pipe is slidingly housed in a hollow piston rod whose interior communicates with said cylinder space via a radial aperture.

5. An appliance as set forth in claim 4 wherein the end of the pump cylinder remote from said closure cap is provide with an axial cylinder extension slidingly confining said hollow piston rod and a shaft of a pump actuating knob.

6. An appliance as set forth in claim 3 and having a helical spring biasing said piston into its end position remote from said closure cap.

7. An appliance as set forth in claim 5 wherein said helical spring is disposed between said cylinder extension and tubular extensions of said knob and of the cylinder, said tubular extensions telescopically engaging each other.

8. An appliance as set forth in claim 3 wherein said last mentiond check valve in the pump is disposed in a transverse wall of the pump cylinder remote from said closure cap.

9. An appliance as set forth in claim 3 wherein said pump cylinder, said pump piston, and said closure cap consist of shock resistant plastic material.

10. An appliance as set forth in claim 1 wherein said lid has a bore beneath its check valve, the bore having means for connection to a suction hose.

* * * * *